May 9, 1933. W. F. HERRICK 1,908,243
PARACHUTE
Filed March 27, 1931 2 Sheets-Sheet 1

INVENTOR
William F. Herrick
BY
ATTORNEY

May 9, 1933.  W. F. HERRICK  1,908,243
PARACHUTE
Filed March 27, 1931  2 Sheets-Sheet 2
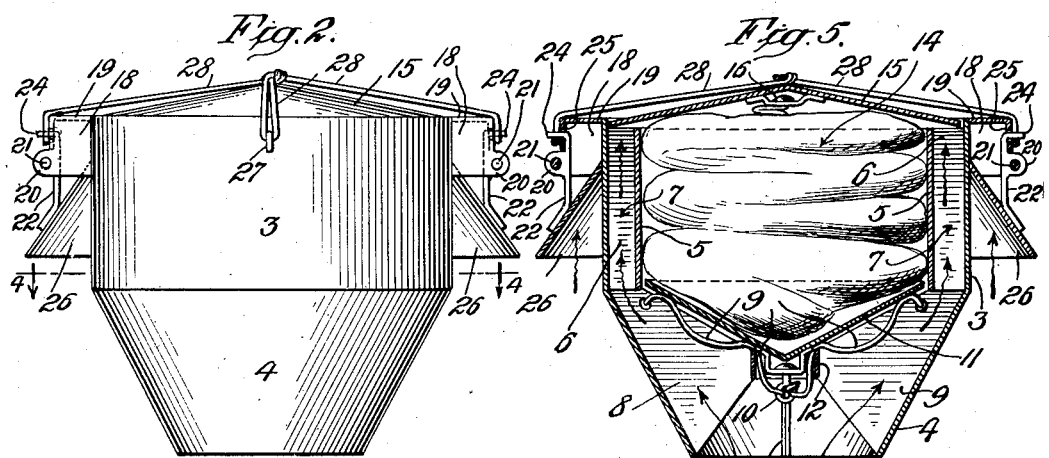
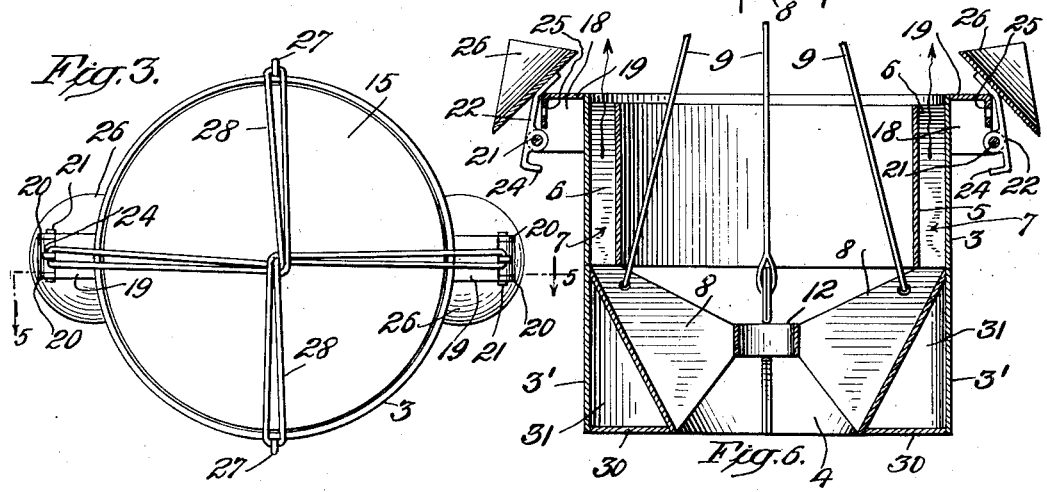
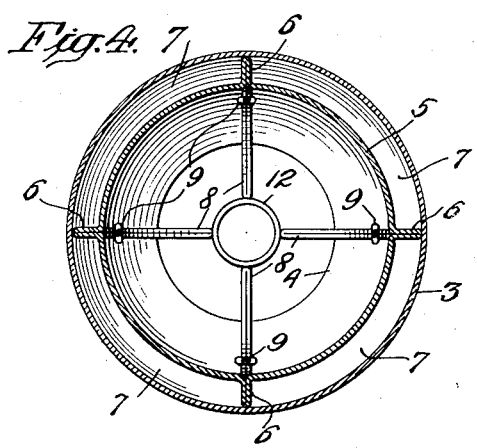
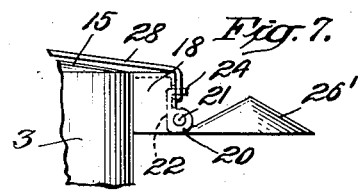
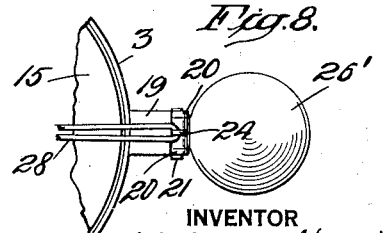
INVENTOR
William F. Herrick
BY
ATTORNEY Patented May 9, 1933

1,908,243

UNITED STATES PATENT OFFICE

WILLIAM F. HERRICK, OF JACKSON HEIGHTS, NEW YORK

PARACHUTE

Application filed March 27, 1931. Serial No. 525,705.

This invention relates to parachutes and aims to provide means for first confining and then automatically releasing a descending parachute.

A special object of the invention is to provide an improved parachute container from which the parachute will be automatically released and ejected after it has descended a predetermined distance. It has been found impracticable to provide parachute containers which release the parachute immediately because of the danger that the parachute will become entangled with the aeroplane from which it is dropped, and the same disadvantage is found where the parachute is designed to be released from a container by a person because, through panic or inexperience, he may release the parachute too quickly. My invention not only eliminates these disadvantages but also provides a container which has no projecting parts with which the parachute may become entangled, and the ejection and opening of the parachute after it has been released from the container are insured.

A further object of my invention is to provide a parachute container which is not only adapted for use in dropping persons or baggage from aeroplanes, but which may be constructed on a small scale to provide an amusing toy.

In accordance with the invention, a parachute container is provided, having an end open to permit the insertion of the parachute and a closure normally held in position to retain the parachute within the container by means which are released as a result of the action of the air during the descent of the container to permit the withdrawal and free opening of the parachute.

In order that my invention may be clearly understood, I will describe in detail the specific embodiments of it which are shown in the accompanying drawings, in which:

Fig. 2 is an elevation showing a closed container;

Fig. 3 is a plan view of a closed container;

Fig. 4 is a section on the line 4—4 of Fig. 2;

Fig. 5 is a section on the line 5—5 of Fig. 3, showing the parachute packed within the container;

Fig. 6 is a vertical section of an open container provided with a baggage compartment;

Fig. 7 is an elevation of a modified form of aerofoil; and

Fig. 8 is a plan view of the aerofoil shown in Fig. 7.

Figure 1:
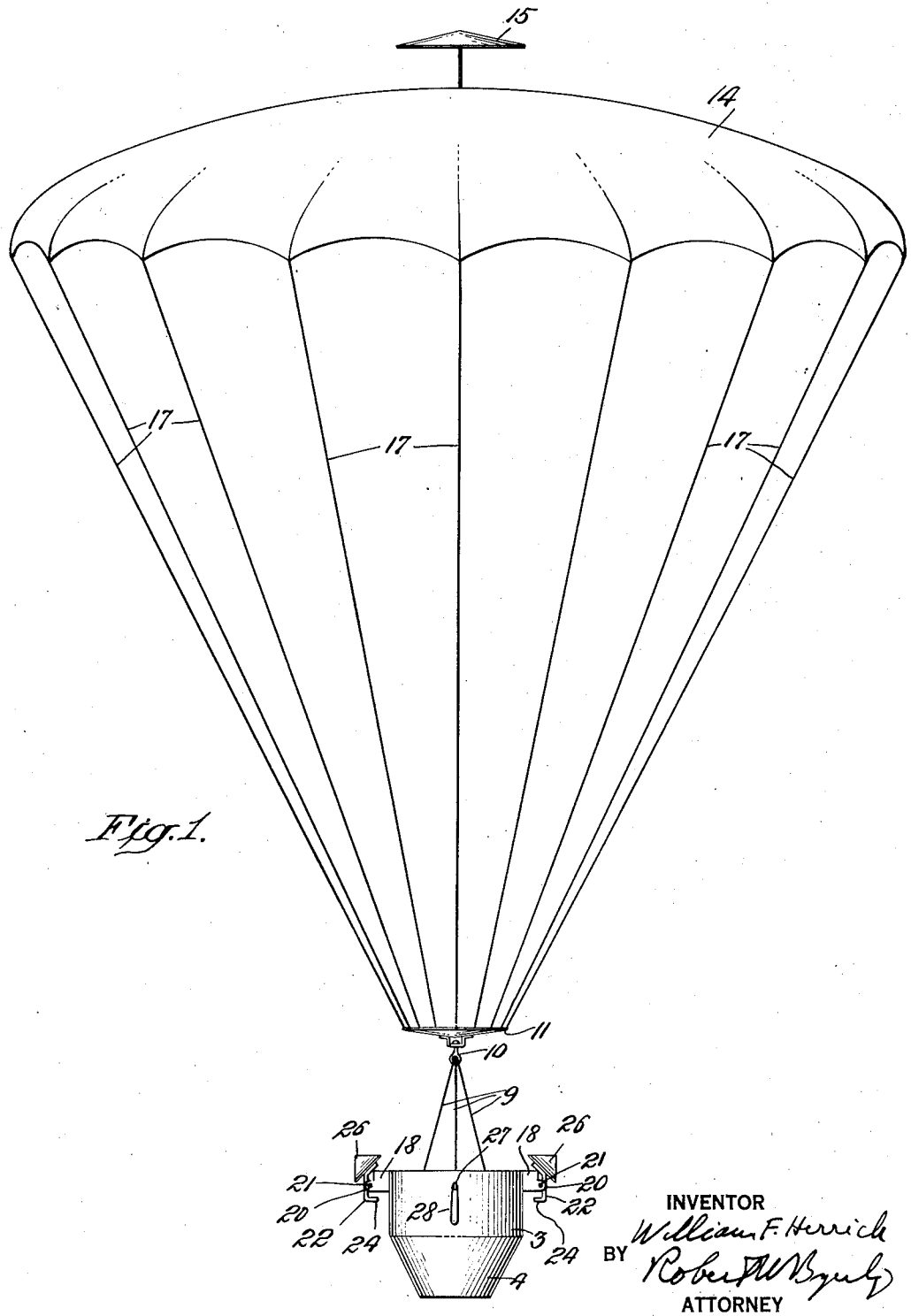
Fig. 1 is an elevation showing the parachute and container open.

The container consists of an outer wall having a cylindrical portion 3 and a frusto conical portion 4, and a cylindrical inner wall 5 contained within the portion 3 of the outer wall with its upper edge slightly below the upper edge of the portion 3. The inner wall 5 is provided with radial vanes 6 which are fixed to the portion 3 of the outer wall and serve to maintain a spaced relation between the portion 3 and the inner wall 5 to provide passageways 7 between said walls for a purpose hereinafter to be explained.

The vanes 6 are provided with extensions 8 having their outer edges fixed to the frusto conical portion 4 of the outer wall and having their inner ends converging towards a point below the inner wall 5 and fixed to ring 12. Attached to extensions 8 are stays 9 which are attached by means of a swivel 10 to closure 11. Parachute 14 has a closure 15 attached to its top by means of swivel 16 and stays 17 attached to closure 11 at points about its periphery.

When packed in the container, parachute 14 is confined within inner wall 5 and between closures 11 and 15. Closure 11 fits within wall 5 and is supported by extensions 8. Closure 15 is of such size that it may fit within portion 3 of the outer wall to close the upper end of the container, including passageways 7.

Means, automatically released during the descent of the container, are provided for locking closure 15 in position to retain the parachute within the container when it is not required that it be permitted to open.

Fixed to portion 3 of the outer wall, near its upper edges, are pairs of plates 18 having covers 19 and ears 20. Journalled in each pair of ears 20 is a shaft 21 having a member 22 mounted thereon for pivotal movement. Each member 22 is formed to provide, at its upper end, a latch finger 24 adapted to project through hole 25 in cover 19, and has attached to its lower end an aerofoil 26 which, during the descent of the container, is actuated by the air to cause member 22 to be pivoted. Fixed to the outer wall are eyes 27 to each of which an elastic band 28 is attached.

The normal position of member 22 is such that the inner edges of aerofoil 26 lie against the outer wall of the container and latch finger 24 projects through hole 25. To lock the closed container, bands 28 are looped about each other, above closure 15, one of said bands is drawn under tension over the edge of one of covers 19 and is looped about the projecting latch finger 24 and the other band is drawn under tension over the edge of the other cover 19 and is looped about the corresponding latch finger. To prevent tensioned band 28 from exerting a force on latch finger 24, which will tend to cause member 22 to be pivoted, band 28 is ordinarily looped about latch finger 24 at a point directly above shaft 21, at which point, band 28 is perpendicular to latch finger 24 so that the band will not become disengaged from said latch finger unless member 22 is caused through aerofoil 26 to be pivoted. Thus the only force occasioned by band 28, with respect to shaft 21, is exerted in a vertical direction and checks the free pivoting of member 22 which would permit band 28 and latch finger 24 to become disengaged accidentally. It will be apparent that the nearer to the outer end of latch finger 24 the point at which band 28 is looped about the latch finger, the less will be the amount of force required to pivot member 22 so that the distance which the container descends before the parachute is released may be adjusted by varying the point at which band 28 is looped about latch finger 24. The velocity which the container must attain, in order that the resistance offered by the air will actuate the aerofoils to pivot members 22 and release band 28 from latch finger 24, may also be adjusted by varying the tension of the band 28, as by making a double loop about latch finger 24, or by twisting the band.

The modified form of aerofoil 26′ shown in Figs. 7 and 8 is similar in operation to aerofoil 26, described above; the modified container shown in Fig. 6 is similar in operation to that described above but has a cylindrical outer wall 3′ surrounding the frusto conical portion 4 and has a removable closure 30 to provide a compartment 31 for baggage or other objects to be dropped from an aeroplane.

The operation of the container is as follows:

When the locked container begins to descend, the greater resistance offered at the end to which aerofoils 26 are attached will tend to cause the container to assume a position wherein the end containing closure 15 is uppermost and air will be caught by the aerofoils. Aerofoils 26 are preferably of such size that the resistance offered to them when descent is first begun is of insufficient force to cause members 22 to be pivoted; but, when the container has descended a sufficient distance to permit parachute 14 to be opened without becoming entangled with the aeroplane from which it is dropped, the velocity of the container is such that the air strikes the aerofoils with sufficient force to cause them to be swung upwardly and outwardly, pivoting members 22 and causing latch fingers 24 to be withdrawn behind covers 19, and away from bands 28, whereby said bands are released. It is to be noted that, by looping bands 28 about each other above closure 15, the disengagement of either of said bands from its latch finger will cause the immediate release of the other band.

As the container descends, air enters its open lower end, strikes closure 11 and, passing through passageways 7, strikes the edge of closure 15 above said passageways. After bands 28 have been released, the pressure of the air on closures 15 and 11 will cause parachute 14 to be ejected from the container. The container is prevented from spinning during descent by radial vanes 6 and extensions 8, but the free opening of the parachute is insured by swivels 10 and 16 which permit stays 9 or 17 to untwist, if they should have been wound together when the parachute was packed.

When it is required that the container be used in connection with the descent of a person, the container may be attached to the person by means of a harness of the type commonly used in parachute descents which may be attached to the container near its lower end. When baggage, mail or other articles are to be dropped, they may be similarly suspended from the container or a container of the form shown in Fig. 6 may be used, the articles being placed in compartment 31. Where the container is constructed on a small scale for use as a toy, the construction may be that shown in Figs. 1 to 5.

What I claim is:

1. The combination with a parachute, of a container having open ends, closures therefor, means adapted to hold said closures in position to retain the parachute within the container, and means, actuated by air during the descent of the container, for releasing and expelling said closures and the parachute from the container.

2. The combination with a parachute, of a container having an outer wall, an inner wall spaced from said outer wall to form a passageway therebetween, releasable means for holding the parachute within the container, and means extending across said passageway, actuated by the flow of air through said passageway on the descent of the container, to withdraw the parachute therefrom upon the release of said holding means.

3. The combination with a parachute, of a container having a casing, a latch having a finger, means engaged by said latch finger to retain the parachute within the casing, an aerofoil connected with said latch and actuated during the descent of the container to withdraw the latch finger from said retaining means, and means for expelling the parachute from the casing.

4. The combination with a parachute, of a container having an open end, a closure, a latch, a member engaged by said latch to hold the closure in position to retain the parachute within the container, and an aerofoil connected with said latch and actuated during the descent of the container to release the latch.

5. The combination with a parachute, of a container having an outer wall, an inner wall spaced from said outer wall to form an open passageway therebetween, a latch, means engaged by said latch to retain the parachute within the container, an aerofoil connected with said latch and actuated during the descent of the container to release the latch, and means tending to withdraw the parachute from the container upon the release of said latch, comprising a member extending across said passageway and connected with the parachute.

6. The combination with a parachute, of a container having means for releasably locking the parachute within the container comprising a latch, a resilient member engaged by said latch, and an aerofoil connected with said latch and actuated during the descent of the container to release the latch.

7. The combination with a parachute, of a container having an open end, a closure, a latch, a resilient member engaged by said latch to lock the closure in position to retain the parachute within the container, and an aerofoil connected with said latch and actuated during the descent of the container to release the latch.

8. The combination with a parachute, of a container having an open end, a closure, a latch member mounted near said open end for pivotal movement, means engaged by said latch member to hold the closure in position to retain the parachute within the container, and an aerofoil fixed to said latch member and actuated during the descent of the container to release the latch member.

9. The combination with a parachute, of a container having an open end, a closure, a latch member mounted near said open end for pivotal movement, a resilient member engaged by said latch member to lock the closure in position to retain the parachute within the container, and an aerofoil fixed to said latch member and actuated during the descent of the container to release the latch member.

10. The combination with a parachute, of a container, a releasable latch, mounted for pivotal movement and adapted to be actuated by air during descent, for holding the parachute within the container, and a member attached to said parachute, actuated by air upon the release of said holding means, to withdraw the parachute from the container.

11. The combination with a parachute, of a container, having an inner-wall, vanes projecting from the inner-wall, an outer wall fixed to said vanes, and means for holding the parachute within the container, actuated by air during the descent of the container, to release and withdraw the parachute from the container.

12. The combination with a parachute, of a container, providing a parachute compartment and a baggage compartment, a latch mounted for pivotal movement, means engaged by said latch to retain the parachute within the parachute compartment, and an aerofoil connected with said latch and actuated during the descent of the container to release the latch.

13. The combination with a parachute, of a container, a latch, means engaged by said latch to retain the parachute in the container, an aerofoil actuated by air during the descent of the container to release said latch, and adjustable means for varying the amount of force required to actuate said aerofoil.

14. The combination with a parachute, of a container, a latch, an adjustable resilient member adapted to engage said latch to retain the parachute within the container, and an aerofoil actuated by air during the descent of the container to release said adjustable member from the latch.

15. The combination with a parachute, of a latch, means engaged by said latch to prevent opening of the parachute, an aerofoil connected with the latch and mounted for pivotal movement and actuated during the descent of the parachute to release the latch, and means for preventing rectilinear longitudinal movement of the aerofoil with respect to the parachute.

16. The combination with a parachute, of a container, a latch, means engaged by said latch to prevent the opening of the parachute, an aerofoil connected with the latch and mounted for pivotal movement and actuated during the descent of the container to release the latch, and means for preventing rectilinear longitudinal movement of the aerofoil with respect to said container.

17. The combination with a parachute, of a container therefor, a latch, means engaged by said latch to confine the parachute, an aerofoil directly constantly connected with the latch and mounted for simple pivotal movement and actuated during the descent of the container to actuate the latch for releasing the parachute, and means for preventing rectilinear longitudinal movement of the aerofoil with respect to the container.

In testimony whereof I have hereunto set my hand.

WILLIAM F. HERRICK.